Patented May 9, 1939

2,157,559

UNITED STATES PATENT OFFICE 2,157,559

METHOD OF PREPARING HYPOCHLORITES

Irving E. Muskat, Akron, and George H. Cady, Wadsworth, Ohio, assignors to Pittsburgh Plate Glass Company, Allegheny County, Pa., a corporation of Pennsylvania No Drawing. Application April 14, 1937, Serial No. 136,804

11 Claims. (Cl. 23—86)

The present invention relates to a method of preparing hypochlorites; more particularly it refers to a method of making hypochlorites by the reaction of chlorine monoxide with alkaline materials.

In accordance with this invention we have been able to prepare a composition in which the active chlorine content is unusually high in a simple and economical manner.

True calcium hypochlorite is distinguished from bleaching powder by the fact that bleaching powder is essentially

that is, it contains one hypochlorite group and one chlorine atom per molecule; while "true" calcium hypochlorite is represented by the formula

that is, it contains two OCl groups for each atom of calcium. Since this group constitutes the active radical of the compounds, "true" calcium hypochlorite has a much greater oxidizing value than bleaching powder. This oxidizing power is usually expressed in terms of "active chlorine" content; that is, twice the weight of the hypochlorite chlorine divided by the weight of the sample. Multiplying this figure by 100 gives the "active chlorine" percentage. "True" calcium hypochlorite has a theoretical "active chlorine" content of 99.2%, while the ordinary bleaching powder of commerce has an "active chlorine" content of approximately 35–38%. There is, therefore, a great advantage with the "true" hypochlorite with respect to its oxidizing strength, its purity, and shipping, storing and handling costs as compared with bleaching powder. In addition, "true" calcium hypochlorite is usually more stable. This advantage has spurred many efforts to prepare "true" calcium hypochlorite. Products containing from 65% to 72% "active chlorine" are now articles of commerce, but they obviously fall short of being pure calcium hypochlorite with its "active chlorine" content of 99.2%.

In accordance with the present invention we have found that chlorine monoxide at a temperature above about 25° C. preferably in the presence of a gaseous diluent may be caused to react with calcium hydroxide to form a product containing a very high percentage of true calcium hypochlorite and, therefore, possessing a substantially higher "active chlorine content" and greater stability than any product now available on the market. The treatment may be carried out with desirable results using mixtures of chlorine and chlorine monoxide.

Theoretically, the reaction proceeds as follows:

$$Cl_2O + Ca(OH)_2 \rightarrow Ca(OCl)_2 + H_2O$$

Chlorine monoxide may conveniently be prepared by contacting chlorine gas with mercuric oxide or by contacting chlorine with soda ash or $NaHCO_3$ and in the presence of a small amount of moisture (e. g. less than 20% by weight). The reactions involved in the latter method may be expressed by the equations:

$$2Na_2CO_3 + 2Cl_2 + H_2O \rightarrow Cl_2O + 2NaCl + 2NaHCO_3$$
$$2NaHCO_3 + 2Cl_2 \rightarrow 2NaCl + Cl_2O + 2CO_2 + H_2O$$

In case sodium bicarbonate ($NaHCO_3$) is employed, water is supplied by the reaction.

The chlorine monoxide may be prepared in either liquid or gaseous medium. If a liquid medium is employed it is liberated from the medium for subsequent transfer to a gas diluent by distillation. If it is prepared in a gaseous medium, the latter may act as the diluent during the subsequent reaction with lime. Convenient embodiments of these methods are disclosed in co-pending applications to George H. Cady, Serial No. 190,618, filed February 15, 1938, and to Irving E. Muskat and George H. Cady, Serial Nos. 136,802 and 136,803 filed April 14, 1937.

Chlorine monoxide, produced in known manner, may be passed over or agitated with hydrated lime in powdered form. Preferably it is diluted by at least an equal volume of inert materials such as air or nitrogen. Chlorine may also be present in the reaction mixture. This element normally reacts with hydrated lime to form bleaching powder or calcium chloride in admixture with calcium hypochlorite. However, when chlorine monoxide is present, the bleaching powder or calcium chloride is converted largely into calcium hypochlorite.

Small amounts of oxides of chlorine other than chlorine monoxide may be present in such small amounts as not to interfere in the reaction. The temperature may be maintained at any value above 25° C., but we prefer to keep it between 30° and 50° C. However, higher temperatures up to 150° C. or above are contemplated. Alternatively the reaction may be carried out below 25° until the reaction has gone as far as it will at that temperature, and then be completed at temperatures above 25° C. This gives as good a product as that produced entirely at the higher temperatures. Proper control of the temperature is attained by any convenient means.

The hydrated lime used may be prepared in known manner by slaking calcium oxide with water. The calcium oxide should preferably be active and of good purity to insure a final product with a high percentage of calcium hypochlorite. Lime of commercial quality yields a good product.

It is obtained as a powder by slaking quicklime with water in an amount insufficient to form a paste or slurry. Usually the amount of either uncombined calcium oxide or water in the powder is not large, for example, greater than about 20%. However, considerable variation is sometimes permissible. Because of its small reactivity toward chlorine monoxide, however, a large excess of calcium oxide is preferably to be avoided. On the other hand, the proportion of water may be large and the lime may be suspended in the form of a fluid slurry. When a solution or suspension of calcium hypochlorite is prepared from milk of lime, it is preferred that the amount of chlorine monoxide and chlorine should be limited to such an extent that the lime is not completely used up; otherwise, the calcium hypochlorite will decompose rapidly. If the proper precautions are taken it is possible to prepare solutions or suspensions from which solid calcium hypochlorite may be separated by filtration, evaporation, crystallization or by any suitable combination of these operations.

Counter-current flow during contact of concentrated chlorine monoxide with dry calcium hydrate is usually attended by excessive formation of chlorate of lime and chlorine gas. However, when the chlorine monoxide is properly diluted with such gas as air this tendency is substantially suppressed, and counter-current flow is both permissible and desirable.

During the reaction, agitation alone, or accompanied by grinding in order to expose fresh surfaces of the lime particles, is advantageous. Any convenient device, for example a ball or tube mill, is suitable for the purpose.

The products manufactured by the above processes usually contain water, which should be removed in order that the stability of the calcium hypochlorite may be increased. Flash drying or vacuum drying may be resorted to. A substantially dry product is formed when the preparation of the calcium hypochlorite involves the use of chlorine monoxide, mixed with inert gases, at temperatures in the neighborhood of 100° C. or higher.

In the processes described in this application it is usually, though not always, found that chlorine and, at times, chlorine monoxide remain in the inert gas; consequently, it is desirable that the gas should be continually recirculated, with suitable additions of chlorine monoxide, within the system in order that the loss of valuable materials may be minimized.

The following examples will serve to show the operation of our process:

1. A gas containing nine volumes of air to one volume of chlorine monoxide was passed over substantially pure, active hydrated lime maintained at 30° C. in a suitable agitator. After a slight excess of chlorine monoxide had been passed over the lime, the product was dried and contained 82.5% "active chlorine".

2. In another run the lime was held at 20° C. until some chlorine monoxide began to pass over the lime without absorption. The temperature was then raised to 40° and more chlorine monoxide added. After a small excess of chlorine monoxide had been used the product obtained, when dried, contained 85.6% "available chlorine".

3. In a run under the same conditions except that a reaction temperature of 10° C. instead of 40° C. was employed, and a large excess of chlorine monoxide was passed, a product was obtained containing only 67.7% of active chlorine. This illustrates the effect of low temperatures in the reaction.

The reaction has been described with particularity in connection with the preparation of calcium hypochlorite. However, the process may also be employed in the preparation of hypochlorites of sodium, potassium, barium, strontium, etc. In such case the hydroxide of the desired metal is substituted for calcium hydroxide. Similarly, the process is not limited to the treatment of hydroxides of these metals but may be applied to the treatment of other reactive alkali and alkaline earth metal compounds to produce the corresponding hypochlorites. For example, the chlorides of these metals such as calcium chloride or bleaching powder may be treated with chlorine monoxide in accordance with our invention to produce stable compounds of high active chlorine content.

The embodiments of the invention herein described are to be considered as exemplary. Numerous modifications may be made therein without departure from the spirit of the invention or the scope of the appended claims.

What we claim is:

1. A process of preparing calcium hypochlorite which comprises contacting solid calcium hydroxide with chlorine monoxide in the presence of an inert diluent gas and maintaining the temperature above 25° C. during at least a portion of the process.

2. A process of preparing calcium hypochlorite which comprises admixing chlorine monoxide with air and then passing the mixture through dry lime at a temperature between 25° and 50° C.

3. A process of preparing calcium hypochlorite which comprises passing a mixture of chlorine and chlorine monoxide and an inert gas through a slurry of lime.

4. A process of preparing calcium hypochlorite which comprises contacting solid calcium hydroxide with chlorine monoxide at a temperature above 25° C.

5. A process of preparing the hypochlorite of a metal of the group consisting of the alkali and alkaline earth metals, comprising contacting a solid hydroxide of the metal with chlorine monoxide gas at a temperature above 25° C.

6. A process of preparing the hypochlorite of a metal of the group consisting of the alkali and alkaline earth metals which comprises contacting a solid hydroxide of the metals with chlorine monoxide gas in the presence of a diluent gas at a temperature initially below 25° C. and then when the reaction to form the hypochlorite slows up raising the temperature above 25° and continuing the reaction.

7. A process of preparing the hypochlorite of a metal of the group consisting of the alkali and alkaline earth metals which comprises contacting a solid hydroxide of the desired metal with chlorine monoxide gas at not substantially less than 100° C. in the presence of a gaseous diluent whereby to produce essentially dry hypochlorite.

8. A process of preparing the hypochlorite of a metal of the group consisting of the alkali and alkaline earth metals comprising contacting the hydroxide of the desired metal with chlorine monoxide containing substantial amounts of chlorine and at a temperature above approximately 25° C.

9. A process of preparing stable hypochlorites of the metals consisting of the group alkali and alkaline earth metals which comprises treating a reactive hydroxide of said group with a mixture of chlorine and chlorine monoxide.

10. A process of preparing stable calcium hypochlorite of high active chlorine content which comprises treating calcium hydroxide with a mixture of chlorine and chlorine monoxide.

11. A process of preparing calcium hypochlorite which comprises treating a solid lime containing moisture with chlorine monoxide at a temperature above 25° C.

IRVING E. MUSKAT.
GEORGE H. CADY.